United States Patent [19]

Fiala

[11] 3,764,166

[45] Oct. 9, 1973

[54] APPARATUS FOR THE COUPLING OF A MOBILE ROLL TRAILER

[75] Inventor: Winfried Fiala, Korntal, Germany

[73] Assignee: Martin Fiala KG, Korntal, Germany

[22] Filed: Mar. 9, 1972

[21] Appl. No.: 233,096

[52] U.S. Cl. ............................. 280/425, 214/505
[51] Int. Cl. ..................... B62d 53/06, B60d 1/00
[58] Field of Search .................. 280/425 A, 423 B

[56] References Cited
UNITED STATES PATENTS

| | | | |
|---|---|---|---|
| 3,450,417 | 6/1969 | Cramer | 280/425 A |
| 2,389,211 | 11/1945 | Pointer | 280/425 A X |
| 3,207,338 | 9/2965 | Felborn | 280/425 R X |

Primary Examiner—Leo Friaglia
Assistant Examiner—J. Rubenstein
Attorney—Walter Becker

[57] ABSTRACT

A coupling apparatus, especially for coupling a traction vehicle to a trailer vehicle in which a socket on one vehicle receives the free end of an arm on the other vehicle with the socket having a region intermediate the ends the same width as the arm and tapering out rearwardly from the said region. The arm tapers inwardly toward the free end and the socket includes centering means to engage the arm and center it in the socket.

12 Claims, 8 Drawing Figures

PATENTED OCT 9 1973 3,764,166

APPARATUS FOR THE COUPLING OF A MOBILE ROLL TRAILER

The invention relates to an apparatus for the coupling of a mobile roll trailer which is capable of being raised by means of a swan neck of a traction vehicle and which has a coupling jaw adapted for receiving an arm of the swan neck, the coupling jaw having an introduction opening, a front and rear support for the arm, the arm being tapered in width, at least in the area of its free end, and a receiving means for a positive locking means effective in the direction of traction.

It is an object of the invention to provide, in apparatus of the said type, a means such that a rapid connection between a roll trailer and a traction vehicle carrying the swan neck is ensured, so that the coupling procedure can be carried out in the travelling operation and irrespective of inclined positions, within limits, of the arm relative to the longitudinal axis of the coupling jaw, such that a to-and-fro maneuvering and in particular further assistants for the carrying on of the coupling procedure are not necessary.

These and other objects and advantages of the invention will appear more clearly from the following specification, in connection with the accompanying drawings, in which.

Figure 1:
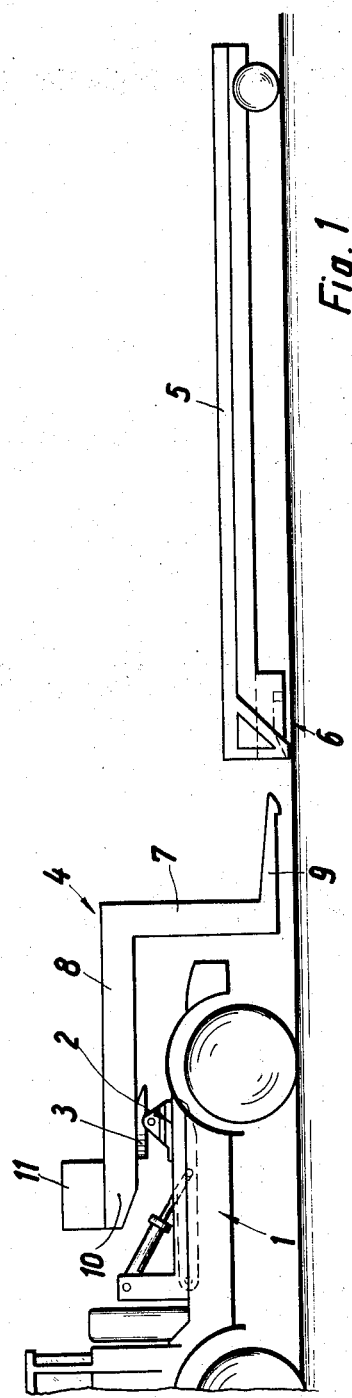
FIG. 1 shows a traction vehicle, in the form of a saddle an having a adjustable fifth wheel coupling, and a swan neck connected thereto in a disposition appropriate for the introduction of a swan neck arm into the coupling jaw of roller trailer.

The present invention is characterized primarily in that the width of the coupling jaw in a zone lying in the area of the introduction opening, at least in its upper area, corresponds to the width of the related part of the arm, that the coupling jaw behind its zone adapted to the width of the swan neck is widened at both sides, and that behind the front support there is provided a centering means for the front end of the arm.

The arrangement of a coupling apparatus according to the invention renders possible the carrying out of the coupling procedure also with considerable angle deviation between the longitudinal direction of the arm of the swan neck to be introduced into this as the loading frame and the swan neck are aligned against one another automatically via the centering means provided for the front end of the swan neck arm as soon as the loading frame is lifted over the swan neck.

In the arrangement of the invention, it may be advantageous to select the width of the coupling jaw in the zone lying in the area of the introduction opening above the whole coupling jaw height corresponding to the width of the rear part of the arm as hereby a comparatively long guide results which without great surface stresses and thereby also without the danger of greater wear renders possible a narrow construction of the zone in which the coupling jaw is adapted to the width of the arm. In conjunction with a narrow guide zone it may be expedient with regard thereto to render possible inclined positions as great as possible between the longitudinal direction of the arm and the longitudinal direction of the coupling jaw without breakdown in the coupling procedure to design the arm to be introduced into the coupling jaw tapering in width at least over the greatest part of its length towards its free end. A coordination between the width of the swan neck arm and the width of the coupling jaw to the effect that these must correspond to one another is only necessary in the zone of the swan neck arm which lies in its resting position between the corresponding guides faces provided in the area of the introduction opening of the coupling jaw.

For facilitating the fitting in of the arm of the swan neck in the coupling jaw it may be of advantage within the scope of the invention to widen downwards the coupling jaw in its area adjacent to the introduction opening. Furthermore it may be expedient according to the invention to allow the lateral walls of the coupling jaw in its area bounding directly on the introduction opening to run outwards obliquely from one another in order upon fitting in, to avoid a hooking. Referred to the whole length of the coupling jaw these inclined faces correspond in order of magnitude to phases so that the zone of the coupling jaw adapted in width to the width of the swan neck arm may lie near the introduction opening.

The centering for the front end of the swan neck arm may within the scope of the invention be formed by centering faces inclined towards one another and running obliquely downwards disposed in the coupling jaw which centering faces with suitable arrangement of the swan neck arm be formed if necessary also for the rear supporting of this. The centering faces may within the scope of the invention diverge from the upright side walls of the coupling jaw or be formed also by suitably inclined sections of the side walls of the coupling jaw.

If the centering faces lie in the area of the lower support for the swan neck arm then it has been proved advantageous to arrange the receiving means for the positive locking effective in the direction of traction between the centering faces so that a nose engaging in the receiving means and provided on the swan neck arm can after engaging in the receiving means at the same time effect the lateral fixing for the swan neck arm in the area of the rear support.

In this connection it may within the scope of the invention be advantageous to form the centering faces by means of the inclined walls of a trough in the floor of the coupling jaw in the area of which the rear support lies.

Referring now to the drawings in detail, a traction vehicle for use in connection with the invention comprises a saddle tractor 1 having a fifth wheel coupling 2 thereon, the saddle plate 3 of the coupling receiving a swan neck 4 by means of which the saddle tractor 1 can be connected to a roller trailer 5, the rear end of the swan neck including a tongue engageable with a coupling jaw 6 on the trailer.

The swan neck 4 is of generally Z-shape and comprises a cross piece 7 and two arms 8 and 9. The forward end of the arm 8 is fixed to the saddle plate of the fifth wheel coupling 2, the said arm 8 extending beyond the saddle plate and the free-end 10 of the arm preferably carrying a counterweight 11 whereby the swan neck 4, when the roller trailer 5 is not coupled, is held in a position of balance suitable for carrying out the coupling procedure. When the swan neck 4 is in its balanced position, the arm 9 thereof is disposed generally horizontally, so that such arm 9 can be pushed into the coupling jaw 6 of the trailer 5 simply by moving the saddle tractor 1. Since, as will be explained in greater detail hereafter, the construction of the coupling jaw 6 according to the invention allows of the coupling together of the trailer and swan neck arm 9 even though the latter is not aligned with the center line 12 of the trailer, the coupling procedure may be carried out both quickly and effectively simply by movement of the tractor.

Figure 8:
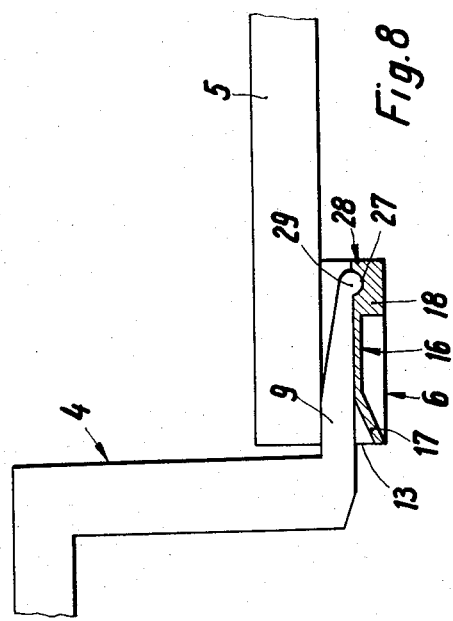
FIG. 8 is a view similar to FIG. 5 showing an alternative tongue and coupling jaw configuration.

The construction of the coupling jaw 6 according to the invention and constructional features of the swan neck 9 necessitated thereby will now be described with reference to FIGS. 5 to 8. Thus, referring now to FIGS. 5 to 8, the coupling jaw 6 provided on the loading frame 5 is of approximately box-like form and has an introduction opening 13. The opening 13, as FIG. 7 shows is rectangular in cross section and is bounded by the free edges of the horizontal upper wall 14, the vertical side walls 15 and the base 16. The base 16, has, as FIG. 8 shows, an inclined ramp section 17 running downwards towards the introduction opening 13, thus to give a comparatively great height of the introduction opening 13 thereby facilitating the engagement of the swan neck arm 9 with the coupling jaw. At its innermost end the base 16 is reinforced by a transversely extending thickened region 18.

As again can be seen from FIG. 7, the base 16 has in the area thereof bounding the ramp section 17, a stepped cross section in which the central zone 19 lies lower than the lateral zones 20. The lateral zones 20 may be of cranked form when viewed in cross section, as shown in full line in FIG. 7 or they may be uniformly inclined as shown partly in full line and partly in dotted line.

The function of such a construction of the base 16 is to effect centering of the forward end of the tongue defined by the swan neck arm 9 on introduction thereof into the coupling jaws 6. The swan neck arm is, in the construction according to the invention, positively located (FIG. 6) only in the area of the introduction opening 13 by means of the side walls 15, such walls, as can be seen from FIG. 6, being spaced apart, in a zone 21 adjacent to the introduction opening by a distance which corresponds to the width of that part of the tongue 9 which, in resting position, lies in this area. From the zone 21 the coupling jaw 6 is widened in the direction of insertion, the side walls 15 diverging symmetrically relative to the longitudinal center line of the coupling jaw. This widening of the coupling jaw 6 enables the swan neck arm to be driven into engagement with the jaw with minimal maneuvering even with non-alignment of the tongue relative to the longitudinal axis of the coupling jaw 6. In the construction shown in FIG. 6, a non-alignment of an extent corresponding to the angle indicated at 22 between the section 15' of a side wall running obliquely outwards and the corresponding side of the swan neck arm 9 indicated with 9' can be accommodated.

Figure 6:
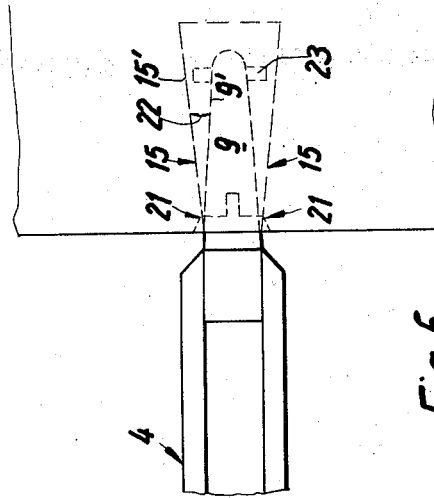
FIG. 6 is a plan of the arrangement shown in FIG. 5.
Figure 7:
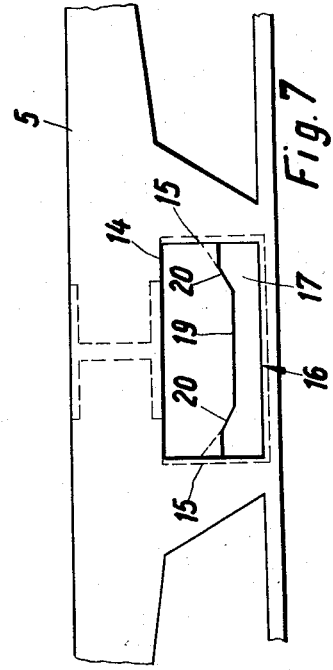
FIG. 7 is a front end view of the trailer showing the coupling jaw or socket from front to rear.

If the swan neck arm 9, during the coupling operation is guided in a swivel position, into the coupling jaw 6 then, upon raising the swan neck, the free end of the arm 9 comes into contact with the centering faces formed as in the embodiment of FIG. 7, by the upwardly inclined lateral zones 20 or, as shown in FIG. 6, by separately inserted guide faces 23 or the like. As a result of the forces which come into effect on raising of the swan neck for the connection of the loading frame, which forces are consequent upon the reaction between the tongue 9 and the centering faces 20 and 23 respectively, the tongue 9 which was initially out of alignment with the coupling jaw is automatically pushed into the aligned position shown in FIG. 6, the longitudinal axis of the swan neck and of the coupling jaw 6, and thereby also of the trailer 5 coinciding, and thus the roller trailer 5 forms together with the tractor 1 a mobile unit.

Figure 5:
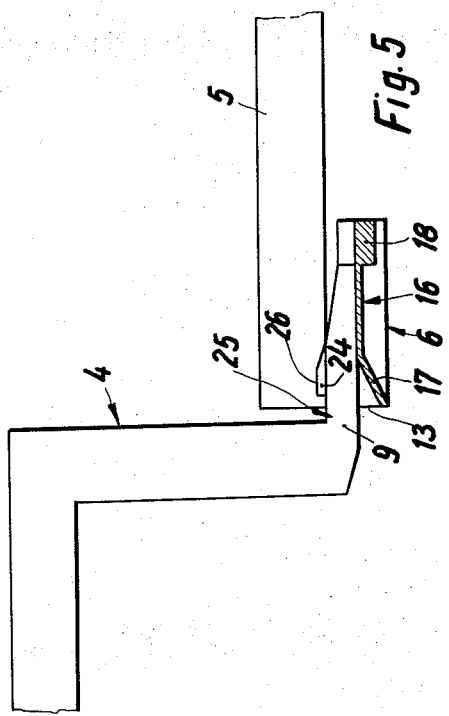
FIG. 5 is a diagrammatic side elevation, partly in section, of a swan neck having the tongue thereof engaged with a coupling jaw.

So as to avoid withdrawal of the tongue from the coupling jaw during traction, a positive locking means is provided therebetween, such means, in the embodiment according to FIGS. 5 and 6, comprising a nose piece 24, engageable with a receiving device 26 provided in the upper wall 14 of the coupling jaw 6 and adjacent the forward end thereof, the nose piece 24 being disposed in the area of a front support 25 of the tongue.

FIG. 8 shows an alternative form of positive locking means. In the case of the embodiment of FIG. 8, a receiving means 27 is provided in the area of the rear support 28 defined by the thickened region 18 a part-spherical nose piece 29 formed at the extremity of the tongue being engageable with the receiving means. By means of a positive locking means of the kind shown in FIG. 8 the swan neck arm, after reaching its resting position, is also fixed laterally, such lateral securing otherwise being effected in the area of the rear support by the centering faces.

As can be seen from FIG. 6, the zone 21 whereat the width of the coupling jaw corresponds to the width of the related zone of the swan neck arm 9 in the engaged position of the tongue, lies at a comparatively small distance from the introduction opening 13 in relation to the length of the coupling jaw, those parts of the side walls 15 which lie between the zone 21 and the introduction opening 13 preferably diverging outwardly of the jaw thus to facilitate the insertion procedure. For facilitating the introduction procedure and also for rendering possible greater oblique positions in the coupling procedure it is furthermore expedient to construct the swan neck arm 9, as can be seen from FIG. 6, tapering towards its free end. Furthermore, the free end of the swan neck arm may advantageously be rounded, as seen in plan view, in order to prevent a drive abutment on initial insertion and to achieve an additional guiding action.

Figure 2:
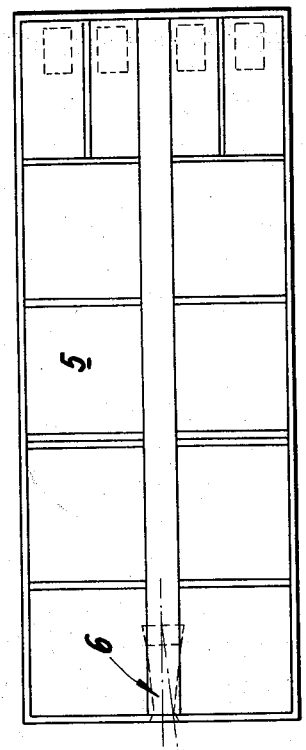
FIG. 2 is a plan view of the arrangement shown in FIG. 1, the tractor being out of alignment with the loading frame and the pivot axis of the coupling lying being offset relative to the longitudinal center line of the trailer.
Figure 2:
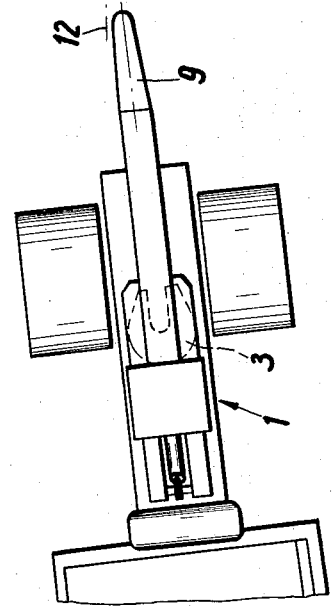
Figure 4:
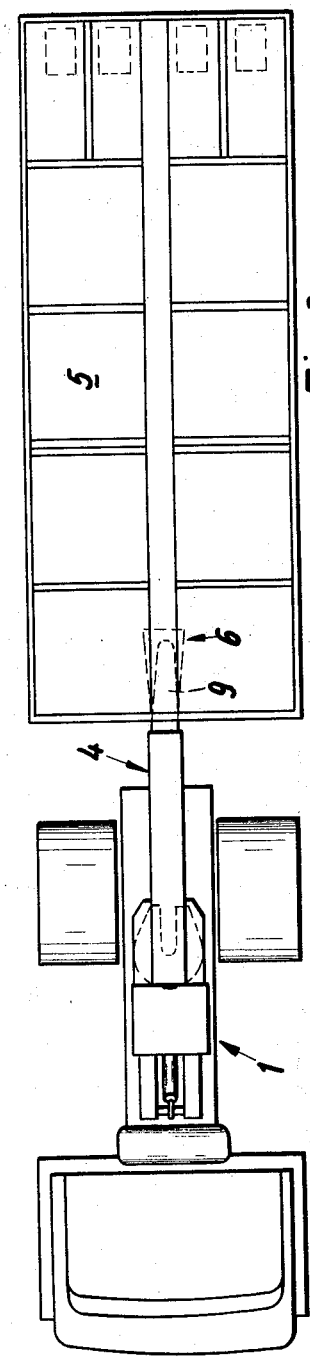
FIG. 4 is a side view corresponding substantially to FIG. 3, the trailer having both a coupling jaw and wheels at each end thereof and the said jaws lying on the longitudinal center line of the trailer.
Figure 3:
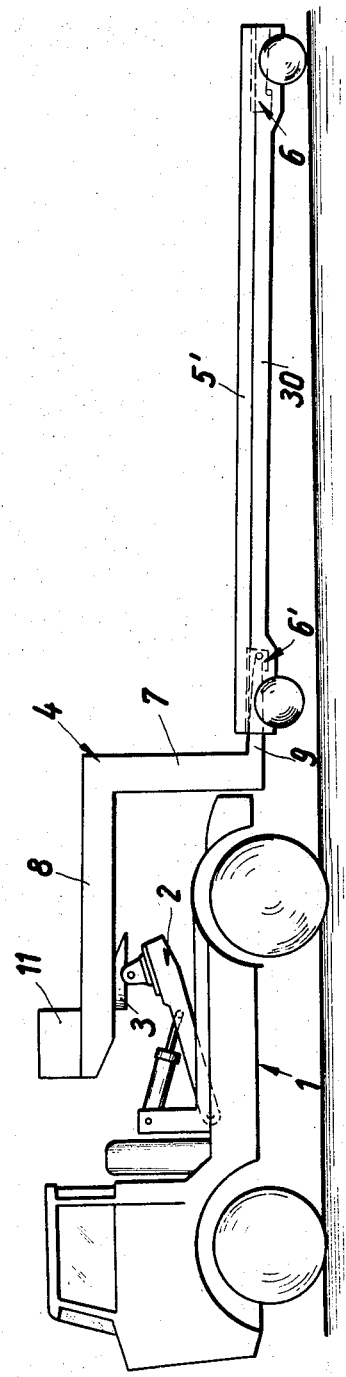
FIG. 3 is a plan view of the arrangement shown in FIGS. 1 and 2, the trailer being in raised condition and being coupled to the traction vehicle by means of the swan neck.

In FIG. 4, in contradistinction to the arrangements of FIGS. 1 and 2, a roll trailer 5' is shown which is provided both with runner wheels and with a coupling jaw 6' at each end. The trailer 5' has a central longitudinal bearer 30 the opposite ends of which is formed as a coupling jaw 6', whereby a particularly space saving arrangement for the coupling jaw 6' results. The construction of the coupling jaw 6' corresponds to that coupling jaw 6 in the embodiments already shown. By arranging for runner wheels and coupling jaws 6' at each end of the trailer the maneuverability is still further improved.

It is, of course, to be understood that the present invention is, by no means, limited to the specific showing in the drawings, but also comprises any modifications within the scope of the appended claims.

What is claimed is:

1. In a coupling apparatus for coupling a trailer vehicle to a traction vehicle, a coupling jaw on one vehicle and a coupling arm on the other vehicle, said coupling jaw having a longitudinal socket formed therein with vertically facing top and bottom walls and laterally facing side walls, said socket having an entrance at the front end into which the end portion of said arm is introduced, the portion of said arm receivable in said socket tapering inwardly toward the free end thereof, vertically facing longitudinally spaced support surfaces on the top and bottom walls of said socket engageable with vertically facing surfaces of said portion of said arm, interengageable elements of force transmitting means on said arm and jaw to transmit longitudinal forces between the vehicles and interengaging upon upward movement of one of said jaw and arm, said side walls of said socket having opposed regions which are spaced substantially the same distance as the width of that part of said portion of said arm which is adjacent thereto when the arm is disposed in the jaw, said side walls of said socket tapering outwardly rearwardly from said regions, and centering means in said socket rearwardly from said regions for engagement with the said portion of said arm near the free end thereof for centering said arm in said jaw.

2. An apparatus according to claim 1 in which at least the side walls of said socket taper outwardly forwardly of said regions thereof.

3. An apparatus according to claim 1 in which said regions are parallel over the entire height of said socket.

4. An apparatus according to claim 1 in which said centering means comprises upwardly facing inclined portions upstanding from the bottom wall of said socket and divergent in their upward direction and engageable with said arm from below.

5. An apparatus according to claim 4 in which said inclined portions extend to the said side walls of said socket.

6. An apparatus according to claim 4 in which said inclined portions are part of the said side walls of said socket.

7. An apparatus according to claim 4 in which said inclined portions form a part of the rearwardly disposed one of said support surfaces in said socket.

8. An apparatus according to claim 4 in which said inclined portions incline upwardly in respectively opposite directions from the longitudinal center line of said socket.

9. An apparatus according to claim 4 in which said inclined portions are formed by inclined walls of a trough region formed in the bottom wall of said socket near the rear end thereof.

10. An apparatus according to claim 4 in which the side of said arm which faces said inclined portions is correspondingly inclined.

11. An apparatus according to claim 1 in which one of the said support surface in said socket is near the front end thereof and comprises a downwardly facing horizontal surface disposed at the top of the socket and engageable with said arm from above.

12. An apparatus according to claim 1 in which said jaw is on said trailer vehicle and said arm is on said traction vehicle, a region of said arm spaced in the forward direction from said one end portion thereof swivelly connected to said traction vehicle, and means for raising and lowering said region of said arm on said traction vehicle for coupling and uncoupling of said coupling apparatus.

* * * * *